United States Patent [19]
Yeoman et al.

[11] Patent Number: 5,632,935
[45] Date of Patent: *May 27, 1997

[54] VAPOR-LIQUID CONTACT TRAY AND DOWNCOMER ASSEMBLY AND METHOD EMPLOYING SAME

[75] Inventors: Neil Yeoman, Merrick, N.Y.; Verne E. Griffith, Wichita, Kans.; Chang-Li Hsieh, Carlisle, Mass.

[73] Assignee: Koch Engineering Company, Inc., Wichita, Kans.

[*] Notice: The term of this patent shall not extend beyond the expiration date of Pat. No. 5,480,595.

[21] Appl. No.: 580,466

[22] Filed: Dec. 28, 1995

Related U.S. Application Data

[63] Continuation-in-part of Ser. No. 234,188, Apr. 28, 1994, Pat. No. 5,480,595.

[51] Int. Cl.$^6$ .................................................. B01F 3/04
[52] U.S. Cl. ........................... 261/114.1; 261/114.3; 261/114.4
[58] Field of Search .......................... 261/114.1, 114.3, 261/114.4

[56] References Cited

U.S. PATENT DOCUMENTS

| | | | |
|---|---|---|---|
| 638,406 | 12/1899 | Stone | 261/114.3 |
| 2,629,654 | 2/1953 | Olney | 261/114.3 |
| 2,646,882 | 7/1953 | Frost, Jr. | 261/114.3 |
| 2,752,138 | 6/1956 | Kittel | 261/114.3 |
| 2,772,080 | 11/1956 | Huggins | 261/114.4 |
| 2,784,953 | 3/1957 | Ng | 261/114.3 |
| 2,787,453 | 4/1957 | Hibshman et al. | 261/114.3 |
| 3,037,754 | 6/1962 | Glitsch | 261/114.1 |
| 4,101,610 | 7/1978 | Kirkpatrick et al. | 261/114.3 |
| 4,504,426 | 3/1985 | Chuang et al. | 261/114.1 |
| 4,550,000 | 10/1985 | Bentham | 261/114.1 |
| 4,956,127 | 9/1990 | Binkley et al. | 261/114.1 |
| 5,049,319 | 9/1991 | Nye | 261/114.1 |
| 5,164,125 | 11/1992 | Binkley et al. | 261/114.1 |
| 5,192,466 | 3/1993 | Binkley | 261/114.1 |
| 5,242,628 | 9/1993 | Nye | 261/114.1 |

FOREIGN PATENT DOCUMENTS

| | | | |
|---|---|---|---|
| 2714438 | 10/1977 | Germany | 261/114.3 |
| 0997707 | 2/1983 | U.S.S.R. | 261/114.3 |

*Primary Examiner*—Tim R. Miles
*Attorney, Agent, or Firm*—Shook, Hardy & Bacon L.L.P.

[57] ABSTRACT

A vapor-liquid contact tray and downcomer assembly is provided with ramps which serve to impart a horizontal directional flow to the liquid exiting the downcomer and/or the vapor passing through the tray. The downcomer includes a bottom plate which closes the outlet region of the downcomer and includes a plurality of ramps which redirect the downwardly flowing liquid to include a horizontal component in the direction of liquid flow across the underlying tray. The downcomer receiving area in the underlying tray can include valves having floating caps which shield the associated openings in the tray against liquid weeping and redirect the vertical movement of the vapor streams to a generally horizontal momentum.

20 Claims, 6 Drawing Sheets

VAPOR-LIQUID CONTACT TRAY AND DOWNCOMER ASSEMBLY AND METHOD EMPLOYING SAME

This is a continuation-in-part of U.S. application Ser. No. 08/234,188, filed Apr. 28, 1994, now U.S. Pat. No. 5,480,595.

BACKGROUND OF THE INVENTION

This invention relates in general to mass transfer and exchange columns, and, more particularly, to a vapor-liquid contact tray and downcomer assembly employed in such columns. The invention also relates to a process in which the tray and downcomer assembly is utilized to improve the contact between vapor and liquid streams flowing through the column.

Horizontally disposed trays are used in many types of mass transfer or exchange columns to facilitate the contact between upwardly flowing vapor streams and downwardly flowing liquid streams. These vapor-liquid contact trays are formed from a solid sheet-like material and contain a plurality of apertures which allow vapor to flow upwardly through the tray for interaction with liquid flowing across the top surface of the tray. In trays known as sieve trays, the apertures are sized small enough so that during operation of the column the pressure of the vapor passing upwardly through the apertures restricts or prevents liquid from passing downwardly through the apertures. In other types of trays such as valve trays, structural elements such as valves, bubble caps, and tunnel caps can be provided about the apertures to seal against the downward passage of liquid.

Downcomers are conventionally provided in combination with the vapor-liquid contact trays to provide a passage through which liquid is removed from one tray and directed to an underlying tray. In single pass trays, the downcomers are provided at opposite ends of vertically adjacent trays so the liquid must flow completely across one tray before it enters the downcomer for passage to the next lower tray. The liquid on the lower tray then flows in the opposite direction across the tray and enters another downcomer. This back-and-forth flow pattern is repeated as the liquid descends through the portion of the column containing the vapor-liquid contact trays. In double pass trays, the liquid is split into two streams which travel in opposite directions on each tray. A center downcomer is provided on alternate trays while two end downcomers are placed at opposite ends of vertically adjacent trays to provide the double pass flow pattern. Multiple pass trays are also utilized and are constructed in a similar manner using multiple downcomers.

A weir is also used on vapor-liquid contact trays to cause liquid to accumulate on the top surface of the tray for enhanced interaction between the accumulated liquid and the vapor bubbling through the apertures in the tray deck. The vapor and liquid interaction on the tray desirably causes a froth to build up on the tray. Because the liquid phase remains substantially continuous in the froth, the vapor and liquid interaction continues in the froth and results in greater mass transfer efficiencies.

The area of the tray deck which contains the apertures in conventional vapor-liquid contact trays is referred to as the "active area" of the tray because the vapor-liquid interaction occurs above the apertures in the tray. In general, the liquid and vapor handling capacity of the tray is limited by the available active area of the tray as well as the area of the downcomer. If the amount of descending liquid or ascending vapor exceeds the tray capacity, flooding of the tray will occur as either the entrained liquid is unable to adequately disengage from the associated vapor stream or the vapor is unable to disengage from the liquid stream.

The active area on many conventional trays does not include the area immediately below the outlet of the downcomer which is associated with the overlying tray. This area of the tray below the downcomer outlet is referred to as the downcomer receiving area and is typically a solid plate which receives the vertically flowing discharge from the downcomer and redirects it horizontally to flow across the tray.

Because greater tray capacities can be obtained by increasing the active area on conventional trays, attention has been focused on expanding the active area of the tray into that portion of the tray underlying the downcomer outlet. However, it is impracticable to simply place apertures in the downcomer receiving area on the tray because the liquid exiting vertically downward from the downcomer could be forced through such apertures. In addition, the presence of apertures in the receiving area could cause vapor to flow upwardly from the receiving area and enter the downcomer where it would interfere with the downward flow of liquid in the downcomer.

One known method of increasing the active area on trays involves decreasing the cross-sectional area of the downcomer outlet by sloping the normally vertical wall of the downcomer to cause a constricted discharge outlet. This reduced area of the downcomer outlet allows more apertures to be placed in the tray deck without being located directly under the downcomer outlet and thus increases the active area of the tray. It is also known, as disclosed in U.S. Pat. No. 5,049,319, to place a seal pan between the tray deck and the downcomer outlet. This allows apertures to be placed in that portion of the tray underlying the seal pan to increase the active area of the tray. In U.S. Pat. Nos. 4,956,127 and 5,164,125, a perforated raised deck is provided beneath the downcomer and the outlet of the downcomer is constructed to form a dynamic seal against entry of ascending vapor. The raised deck is referred to as a raised active inlet area and is said to cause vapor injection into the liquid being discharged from the downcomer, thereby enhancing mass transfer.

Although the capacities obtainable with the improved vapor-liquid contact trays referenced above are notable, the complicated nature of those tray designs may make them too costly for use in many types of processes. In addition, although such trays can be designed to operate efficiently within a limited range of liquid and vapor flow rates, the efficiency of the trays are substantially compromised when the liquid or vapor flow rate falls outside the designed range. A need has thus developed for a less complicated tray design which provides the desired capacity and the desired efficiency over a greater range of operating flow rates.

SUMMARY OF THE INVENTION

It is an object of this invention to provide a vapor-liquid contact tray and downcomer assembly constructed in a manner to increase the area of the tray through which the vapor is able to pass so that the desired mass transfer efficiencies can be obtained over a wide range of operating flow rates.

It is another object of this invention to provide a downcomer bottom plate and associated directional devices in a tray and downcomer so that the momentum of the liquid exiting the downcomer can be redirected from vertical to substantially horizontal, thereby reducing the opportunity for the liquid to weep through the apertures provided in the underlying inlet area of the underlying tray.

As a corollary to the preceding object, it is also an object in one embodiment of this invention to form the directional devices from the bottom plate of the downcomer to avoid the expense and fabrication problems associated with the use of separate hardware components to block the downward momentum of the liquid exiting the downcomer.

It is a further object of this invention to utilize directional devices in the liquid receiving area of the tray to impart a substantially horizontal momentum to the vapor as it passes through the tray deck, thereby facilitating the ability of the vapor to pick up and further add to the horizontal momentum of the liquid being discharged from the overlying downcomer before it impacts on the tray.

It is a still further object of this invention to utilize the directional devices in the liquid receiving area of the tray to impart the horizontal momentum to the vapor and thereby facilitate intermixing and interaction between the liquid and vapor before they reach the center portion of the tray.

As a corollary to the preceding object, it is also an object of this invention to provide the directional devices in association with the tray to impede passage of liquid downwardly through the tray.

To accomplish these and other related objects, in one aspect the invention is directed to a mass transfer column comprising:

an external shell defining an interior region open to the flow of vapor and liquid streams;

a plurality of generally horizontally disposed and vertically spaced apart trays positioned in said open interior region to facilitate contact between the vapor and liquid streams when flowing in the interior region of the column, said trays having an upper surface along which the liquid stream can flow;

at least one downcomer associated with each of said trays and extending downwardly toward an underlying tray to deliver liquid from the associated tray to the underlying tray, said downcomer having an inlet region through which liquid enters the downcomer and an outlet region through which liquid exits the downcomer, said outlet region of the downcomer being positioned above a liquid receiving area of the underlying tray;

a bottom plate closing the outlet region of the downcomer and having a plurality of openings through which liquid may flow to exit the downcomer;

a plurality of spaced apart ramps extending below said downcomer bottom plate in the path of said liquid exiting the downcomer, said ramps comprising a main wall inclined at an angle to a vertical axis of the column and positioned to redirect said liquid exiting the downcomer and impart an at least partially horizontal momentum to the redirected liquid, thereby reducing a vertically downward force with which the redirected liquid impacts the liquid receiving area of the underlying tray;

a plurality of apertures in said trays through which ascending vapor may flow to interact with the liquid stream flowing across the upper surface of the trays;

a plurality of valves positioned on and extending above the liquid receiving area of the trays, at least some of said valves comprising an aperture extending through the liquid receiving area of the tray, a frame extending above the liquid receiving area of the tray, and a floating cap moveable within the frame in response to the upward force of vapor flow into the aperture between a lower position covering said aperture to resist liquid entry therein and a raised position spaced above the tray to permit vapor flow through the aperture.

In another aspect, the present invention is directed to a method for interacting liquid and vapor streams on a vapor-liquid contact tray and downcomer assembly provided in an interior region of a mass transfer column, said assembly comprising a plurality of generally horizontally disposed and vertically spaced apart trays positioned in said open interior region, a plurality of apertures in said trays, at least one downcomer associated with each of said trays and extending downwardly toward an underlying tray, and a bottom plate closing an outlet region of the downcomer, said method comprising the steps:

(1) directing a liquid stream to one of said trays;

(2) flowing the liquid stream across said one tray in a first direction;

(3) directing said liquid stream from said one tray into an inlet region of the associated downcomer and passing the liquid stream downwardly through said associated downcomer;

(4) discharging the liquid stream in said associated downcomer onto a liquid receiving area of an underlying tray with an at least partially horizontal momentum to reduce the vertically downward force with which the liquid stream impacts the liquid receiving area by directing the liquid stream against a plurality of spaced apart and inclined ramps lying below the bottom plate, whereby said liquid stream is redirected by said ramps to have an at least partially horizontal momentum;

(5) flowing said liquid stream across said underlying tray in said opposite direction;

(6) repeating steps (3)–(5) on successive lower ones of said trays;

(7) directing a portion of the vapor stream upwardly through said apertures in the trays to interact with said liquid stream flowing across the trays; and (8) directing another portion of the vapor stream upwardly through the liquid receiving area of the underlying tray and imparting an at least partially horizontal momentum to the vapor stream by passing the vapor stream through a plurality of spaced apart valves extending above the liquid receiving area of the trays and each comprising a second aperture distributed extending through the liquid receiving area of one of the trays and a floating cap moveable within a frame in response to the upward force of vapor flow into the second aperture between a lower position covering said aperture to resist liquid entry therein and a raised position spaced above the tray to permit vapor flow through the second aperture, whereby said vapor stream is redirected by said floating cap to impart said at least partially horizontal momentum.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENTS

Figures 1, 7, 8:
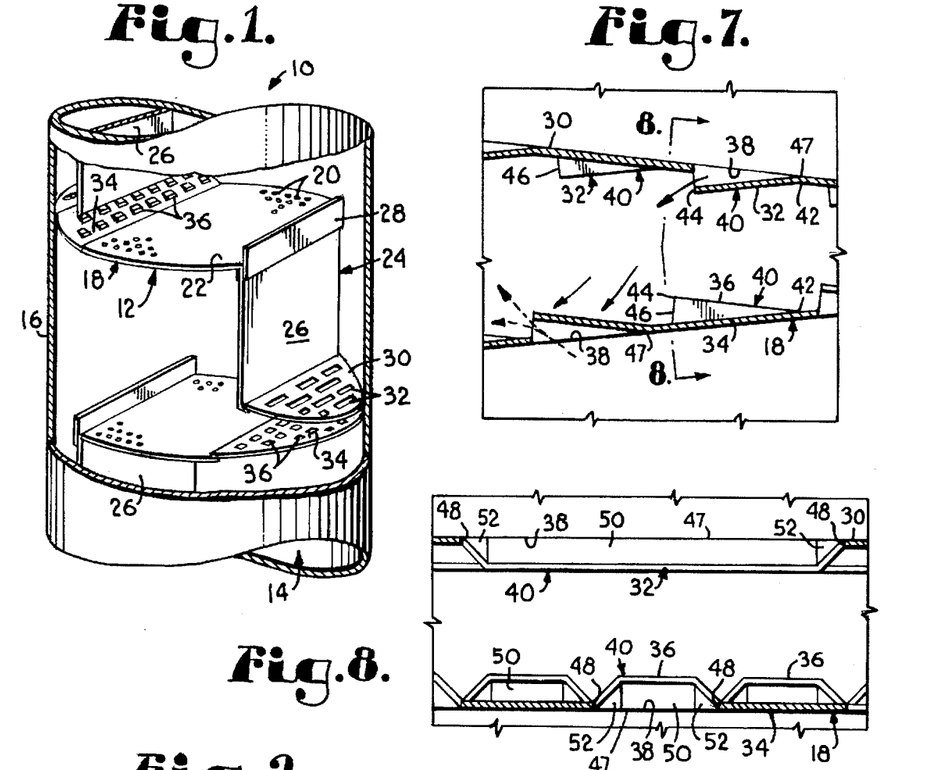
FIG. 1 is a fragmentary perspective view of a mass transfer column employing vapor-liquid contact trays and downcomers constructed in accordance with the present invention, with the downcomer bottom plate being inclined at an angle to the horizontal and the liquid receiving area of the tray deck also being inclined at another angle to the horizontal.
FIG. 7 is an enlarged side elevation view of a portion of the assembly shown in FIG. 2, with arrows being used to illustrate the directional flow of vapor and liquid from the louvres in the downcomer bottom plate and the tray deck.
FIG. 8 is a front elevation view of the louvres in the downcomer bottom plate and the tray taken in generally vertical section along line 8—8 of FIG. 7 in the direction of the arrows.
Figure 2:
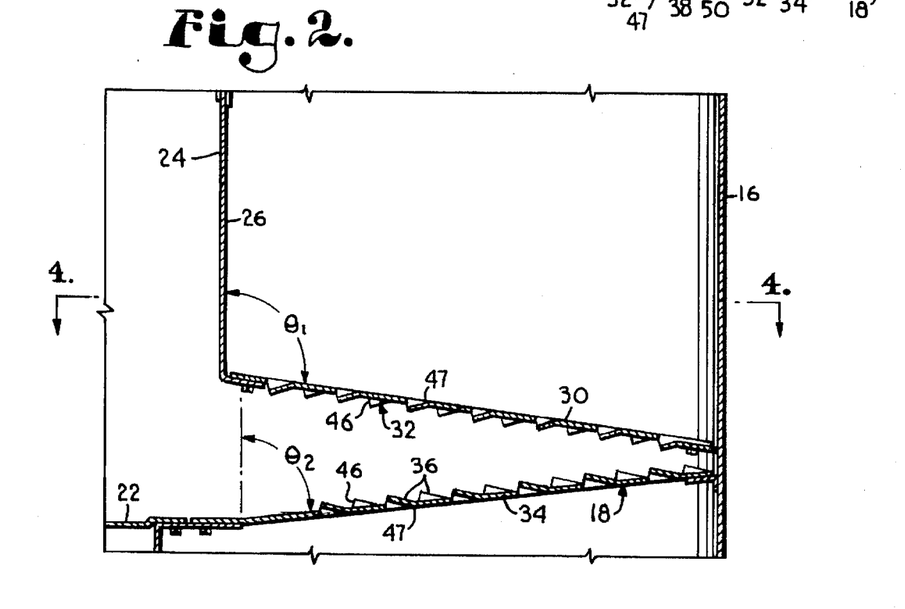
FIG. 2 is an enlarged fragmentary side elevation view of the vapor-liquid contact tray and downcomer assembly shown in FIG. 1.

Referring now to the drawings in greater detail and initially to FIGS. 1 and 2, a mass transfer or heat exchange column is designated generally by the numeral 10 and includes a series of vapor-liquid contact tray and downcomer assemblies 12 located within an open interior region 14 defined by an external shell 16 of column 10.

Column 10 is of a type used for processing liquid and vapor streams, including to obtain fractionation products. The column 10 is vertically elongated and is typically of cylindrical construction although other configurations, including polygonal, may be used. The column 10 can be of any suitable diameter and height and can be constructed from suitable rigid materials.

One or more liquid streams can be directed to the column 10 in a conventional manner. Likewise, one or more vapor streams can be charged to the column 10 or can be generated within the column. The column 10 typically can include other suitable well-known internals such as beds of packing located in areas above and/or below the illustrated assemblies 12 to carry out other desired processing of the liquid and vapor streams. Other appropriate system components such as connections and lines for feed, product removal and reflux streams, reboilers, condensers and the like are not illustrated because of their conventional nature.

The vapor-liquid contact tray and downcomer assemblies 12 of the present invention are located within a portion of the column 10 where the desired interaction between the liquid and vapor streams occurs. Each assembly 12 includes a generally horizontally disposed tray 18 shaped and sized to extend across the internal region 14 of the column 10. The trays 18 are generally planar and plate-like and are supported in vertically spaced apart relationship by suitable mechanisms (not shown) provided on the inner surface of the column shell 16.

A plurality of openings or apertures 20 are provided in the trays 18 and are distributed across substantially the entire surface area of a center portion 22 of the trays. The apertures 20 are sized and distributed to allow upwardly flowing vapor to pass through the trays 18 to interact with liquid flowing across an upper surface of the trays without allowing an appreciable amount of liquid to weep or flow downwardly through the apertures. The apertures can be of any desired shape, including circular and rectilinear. Trays of this type are known as sieve trays. The trays 18 can also include suitable valves, bubble caps, tunnel caps and other mechanisms in combination with the apertures 20 to restrict the downward flow of liquid through the apertures or modify the manner in which vapor passes through the deck.

Each tray 18 also includes at least one downcomer 24 which extends from the associated tray downwardly toward an underlying tray, typically the immediately underlying tray. The downcomer 24 serves to remove liquid from the upper tray and direct it to the lower tray. The downcomer 24 is formed by a solid generally vertically extending plate 26 which is connected at its upper end to an edge of the upper tray 18 and is connected or otherwise placed in contact along its sides with the interior of the column shell 16. The remaining curved side wall of the downcomer 24 is provided by the column shell 16 but it will be appreciated that a separate side wall may be provided, such as when the downcomer is located in the center portion 22 of the tray 18 rather than at the edge of the tray.

As illustrated, the downcomers 24 are located at opposite ends of successive trays 18 to cause a back and forth path of travel for the descending liquid stream. Liquid traveling across the upper tray 18 enters the upper inlet region of the downcomer 24 and travels downwardly through the downcomer to the lower tray 18. The liquid then travels across the lower tray 18 in the opposite direction and enters another downcomer 24 for passage to the next lower tray in a repeating pattern. This type of flow pattern is referred to as a single pass pattern because the liquid flows across the trays 18 as a single stream. It will be appreciated that more than one downcomer 24 can be positioned on each tray to create a two pass or multiple pass flow pattern in a known manner. This is contemplated by and is within the scope of the invention.

A weir 28 is optionally provided adjacent the edge of each tray 18 at the inlet region of the downcomer 24. The weir 28 causes liquid to accumulate on the associated tray 18 to the level of the height of the weir 28 before it spills over the weir and enters the downcomer. The weir 28 can be integrally formed with the downcomer vertical plate 26 or can be a separate component.

A lower outlet region of the downcomer 24 terminates above the lower tray at a level which is generally, but not necessarily always, above the top of the weir 28. The outlet region of the downcomer 24 is closed by a bottom plate 30 which is solid except for the provision of a plurality of louvres 32 which extend downwardly beyond the bottom surface of the plate 30. Louvres 32 are constructed to impart a horizontal momentum to the liquid as it exits the outlet region of the downcomer and falls onto the lower tray. The louvres 32 are directionally positioned so that the horizontal momentum imparted to the discharging liquid is in the direction of intended liquid flow on the lower tray, i.e. toward the next downcomer through which the liquid must pass to reach the next underlying tray.

Figure 3:
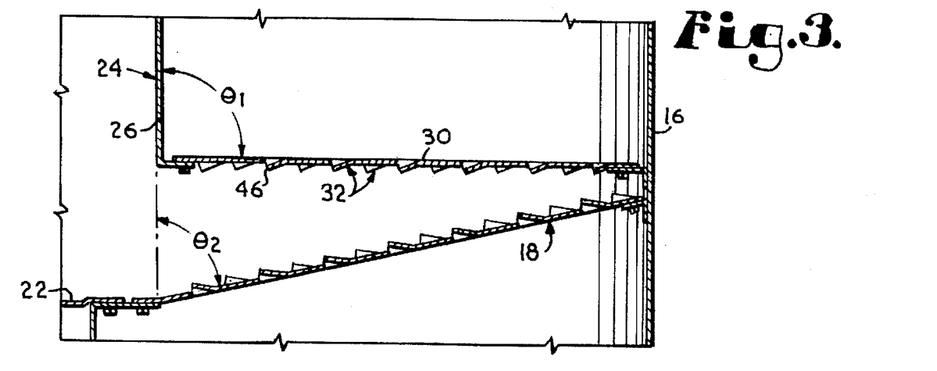
FIG. 3 is an enlarged fragmentary side elevation view of another embodiment of the vapor-liquid contact tray and downcomer assembly which is similar to that shown in FIG. 2 but with the downcomer bottom plate being horizontally disposed.

As is best shown in FIG. 2, the downcomer bottom plate 30 extends from the bottom edge of the downcomer vertical plate 26 at an angle $\theta_1$ of approximately 97° to the vertical. The angle $\theta_1$ is desirably within the range of 60° to 150° and preferably within the range of 90° to 120°. As shown in FIG. 3, the bottom plate 30 is disposed at an angle $\theta_1$ of approximately 90° to the vertical.

Figure 4:
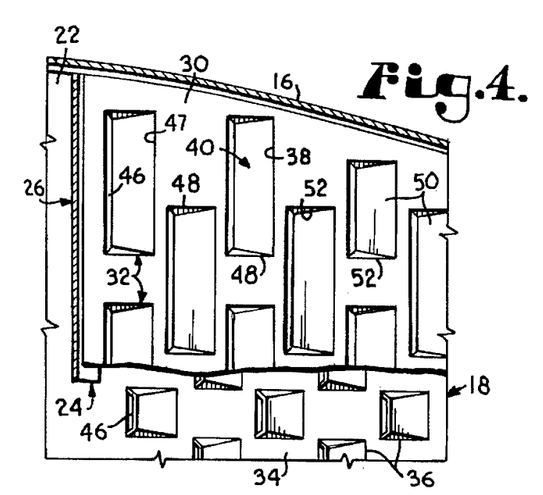
FIG. 4 is a further enlarged fragmentary top plan view of the vapor-liquid contact tray and downcomer assembly shown in FIG. 2 and taken in horizontal section along line 4—4 of FIG. 2 in the direction of the arrows, portions of the downcomer bottom plate being broken away to show the underlying tray deck.

The portion of the tray 18 underlying the downcomer 24 comprises a liquid receiving area 34 having a plurality of louvres 36 generally similar to those provided in the downcomer bottom plate 30 except the tray louvres 36 extend above an upper surface of the receiving area 34 of tray 18 and are of square rather than rectangular configuration as viewed in FIG. 4. Louvres 36 are constructed to impart a generally horizontal momentum to the vapor ascending through the louvres. The louvres 36 are positioned so that the horizontal momentum imparted to the ascending vapor is oriented in the general direction of intended flow of the liquid across the associated tray 18.

The receiving area 34 of tray 18 can be integral with the center portion 22 of tray 18 or can be formed as a separate piece. The forward edge of the receiving area 34 is preferably coplanar with the center portion 22 of tray 18 and the main body of the receiving area 34 extends at an angle $\theta_2$ of approximately 83° to an imaginary vertical line at the forward edge of the receiving area. The angle $\theta_2$ is desirably within the range of 60° to 90° and preferably within the range of 75° to 90°. Angles greater than 90° are generally unsuitable because liquid would tend to accumulate and stagnate at the rear edge of the receiving area 34.

The various components of the assemblies 12 can be fabricated from suitable rigid materials such as metals and polymers. The material selected should be compatible with the liquid and vapor streams and should be capable of withstanding the conditions present within the column 10.

Turning now to FIGS. 4, 7 and 8, the louvres 32 and 36 are shown in greater detail. The louvres 32 in the downcomer bottom plate 30 can be mirror images of the louvres 36 in the receiving area 34 of tray 18 or they can be different sizes and shapes. As shown, the downcomer louvres 32 are elongated to present a rectangular inlet end to a channel 38 which extends through the bottom plate 30 while the tray louvres 36 define a square inlet end to channel 38. For ease of description, the same reference numerals are used with respect to the components of louvres 32 and 36 and the following description of bottom plate louvres 32 is generally applicable to tray louvres 36.

Each louvre 32 in the downcomer bottom plate 30 comprises the channel 38 formed in and extending through the bottom plate 30 and a ramp 40 which defines a portion of the channel 38. The ramp 40 redirects liquid flowing through the channel 38 to impart an at least partial horizontal velocity component thereto to reduce the vertically downward force with which the liquid impacts the liquid receiving area 34 on the underlying tray 18. Desirably, the liquid should exit the bottom plate 30 with as substantial a horizontal velocity as is possible while being consistent with other design considerations. For example, the size of the area through which the liquid is discharged should be sufficient to prevent an unacceptable pressure drop for the liquid passing through the bottom plate 30. Because the pressure drop of liquid exiting the downcomer louvres 32 is more likely to cause operational problems than would result from the pressure drop of vapor exiting the tray louvres 36, the downcomer louvres 32 are generally provided with a greater open outlet area than the tray louvres 36. This is clearly illustrated in FIG. 8 where the downcomer louvres 32 present approximately one and one-half times the total open area of the tray louvres 36. It will be appreciated that the desired open area can be achieved in other manners such as increasing the number of downcomer louvres 32 and providing alternate passages for the liquid, as will be subsequently described with reference to FIGS. 13 and 14. The angle $\theta_1$ of the bottom plate 30 to the horizontal should also be taken into consideration for design purposes because angles closer to 90° make it more difficult to achieve completely horizontal liquid discharge.

The ramp 40 is attached at one end 42 to the bottom plate 30 and extends at an angle to the bottom plate 30 in the direction of the opposite end 44. The opposite end 44 of the ramp 40 is spaced downward from where it attaches to the bottom plate 30 to form a substantially vertical channel outlet end 46 which is positioned below the plane of the bottom plate 30. The outlet end 46 represents the downstream end of the channel 38 which extends through the bottom plate 30, with the upstream or inlet end 47 of channel 38 lying in the plane of the upper surface of bottom plate 30. The outlet end 46 preferably lies in a plane which is substantially vertical or at least extends at an angle to the horizontal and the plane defined by the bottom plate. The outlet end 46 normally, but not necessarily, has an area smaller than the inlet end 47 so that the channel 38 becomes constricted in the downstream direction. Notably, the ramp 40 is attached along its sides 48, as well as at end 42, to the bottom plate 30 so that all of the liquid entering the upstream end of louvre channel 38 through inlet end 47 is redirected and is discharged at the downstream end of the channel 30 through the discharge outlet end 46.

The ramp 40 comprises a main wall 50 which is substantially planar and underlies a substantial portion of the inlet end 47 of channel 38 in the downcomer bottom plate 30. The main wall 50 is attached to the bottom plate 30 at ramp end 42 and is spaced downwardly from the plane of the bottom plate at the opposite end 44 where the channel outlet end 46 is positioned. The ramp 40 also includes side walls 52 that connect the sides of the main wall 50 to the bottom plate along the entire length of the main wall to prevent lateral discharge of liquid from the main wall and to force forward discharge through outlet end 46. The side walls 52 are of triangular configuration and lie in planes that extend at an angle to the plane of the main wall 50. It will, of course, be appreciated that the ramp can be of other configurations such as arcuate in cross section. As a result, there may not be a clear demarcation between the main wall 50 and side walls 52. Preferably, the ramp 40 is integral with the bottom plate 30 and is formed from the material which is displaced to form the inlet end 47 of channel 38 in the bottom plate. As an example, the ramp 40 can be formed in a substantially single step process by punching a slit in the bottom plate and depressing and deforming the material adjacent the slit to form the ramp 40 and resulting channel 38.

As previously mentioned, the louvres 36 in the receiving area 34 of tray 18 are of substantially the same construction as the louvres 32 in the downcomer bottom plate 30 except the discharge outlet ends 46 in louvres 36 are above rather than below the tray 18 and the channel inlet end 47 lies below rather than above the tray 18. As a result, the ramp 40 extends upwardly from a reference horizontal plane and provides the desired angle of egress for the vapor which passes through the receiving area 34 of tray 18. As previously noted with respect to downcomer louvres 32, the ramps 40 in tray louvres 36 should be constructed to provide the desired discharge area for the vapor while taking into consideration the angle $\theta_2$ of the tray deck.

As is best seen in FIG. 4, the downcomer louvres 32 are constructed so that the channel inlet ends 47 are generally rectilinear in configuration with the long dimension being approximately three times the shorter dimension, although other configurations can be utilized. The tray louvres 36 are constructed so that the channel inlet ends 47 are generally square in configuration, although other configurations can also be utilized. The shape of the outlet ends 46 are polygonal but other shapes are possible. The louvres 32 and 36 are positioned in spaced apart relationship in parallel rows with louvres in alternating rows being offset and aligned to form parallel columns of louvres that extend perpendicularly to the rows of louvres. The distribution and density of the louvres in the bottom plate 30 and receiving area 34 of the tray 18 can be varied as desired.

During operation of the column 10, liquid and vapor streams are brought into contact and interact on the vapor-liquid contact trays 18. The descending liquid stream enters the inlet region of downcomer 24 associated with tray 18 and passes downwardly through the downcomer. When the liquid stream reaches the outlet region of the downcomer 24, it encounters the bottom plate 30 and enters louvres 32 through the channel inlet ends 47. The downward momentum of the liquid stream in the downcomers 24 is then redirected by the ramp 40 as the liquid flows through channels 38. The angled main wall 50 of the ramp 40 causes the vertically downward momentum of the liquid to be redirected to a substantially horizontal momentum. As is shown in FIG. 7, the liquid then exits the louvres through discharge outlet end 46 in the direction of the desired liquid flow on the tray 18.

In a similar manner, vapor from a vertically ascending vapor stream enters louvres 36 in the receiving area 34 in the portion of tray 18 underlying the downcomer 24. The vertical momentum of the vapor is redirected by the louvre ramp 40 to a generally horizontal momentum as the vapor exits the louvre outlet end 46.

The use of louvres 32 in the downcomer bottom plate 30 in combination with the louvres 36 in the tray receiving area 34 is particularly advantageous for a number of reasons. The liquid exiting the downcomers has a horizontal momentum which eliminates or substantially reduces the opportunity for the liquid to be forced downwardly through the channels 38 in the liquid receiving area 34 of the underlying tray 18. Entry of liquid into tray channels 38 is further frustrated by the ramp 40 which shields the channels 38 on the tray louvres 36 and provides a vertical rather than horizontal discharge outlet end 46. Because the vapor and liquid streams are exiting the respective louvres in the same direction, it is more likely that the vapor stream will intermix with and carry the liquid to the center portion 22 of the tray before the liquid even contacts the tray 18, thereby further reducing the opportunity for liquid to enter the tray channels 38. The horizontal momentum of the vapor exiting the louvres 36 also reduces the opportunity for the vapor to enter the downcomer outlet region where it would interfere with discharge of liquid from the downcomer and could cause liquid to back up and flood the downcomer. Entry of vapor into the downcomer outlet region is also undesirable because the vapor entering the downcomer bypasses the desired vapor-liquid interaction occurring on the main or center portion 22 of tray 18. Remarkably, louvres 32 in the downcomer bottom plate 30, alone or in combination with louvres 36, prevent entry of vapor into the downcomer 24 over a much wider range of liquid flow rates than would otherwise be possible. This extended operating range is particularly desirable because it allows for greater variability in the operating flow rates without substantial compromise of the design efficiency.

Mixing of the vapor and liquid streams is also facilitated because the vapor and liquid streams are exiting the respective louvres in the same direction, making it more likely that the vapor stream will more smoothly intermix with and carry the liquid to the center portion 22 of the tray 18. This intermixing and interaction of the vapor and liquid exiting the louvres thus complements the vapor-liquid contact that occurs on the center portion 22 of the tray as the remaining portions of the vapor stream pass upwardly through the apertures 20 in the tray and enter the liquid which is accumulating and flowing across the tray 18. Notably, these advantages are attainable without requiring the use of separate hardware components other than the provision of louvres 32 and 36 which can be integrally formed with the associated downcomer bottom plate 30 and tray 18.

Figure 5:
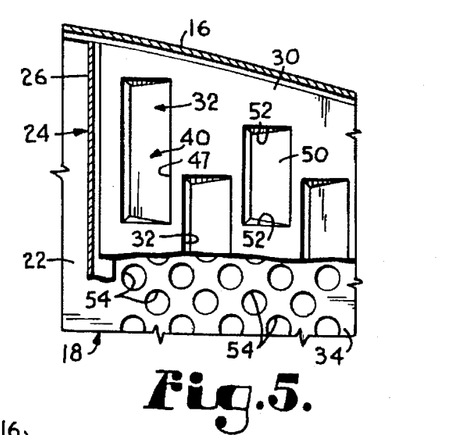
FIG. 5 is a fragmentary top plan view of a still further embodiment of the vapor-liquid contact tray and downcomer assembly similar to that shown in FIG. 4 but with the tray deck containing circular apertures rather than louvres.

Because the louvres 32 and 36 are particularly effective at redirecting the flow of the liquid and vapor streams and shielding the channels 38 in the downcomer bottom plate 30 and tray 18, in certain applications some or all of the louvres can be omitted in either the downcomer bottom plate 30 or the liquid receiving area 34 of tray 18. For example, as shown in FIG. 5, all of the louvres 36 in tray area 34 can be replaced with the openings or apertures 54 of the type that are provided in the center portion 22 of tray 18. As illustrated, the apertures 54 are circular in configuration and have a diameter which is approximately one-half of the shorter dimension of the rectangular louvre channels 38. Other sizes are, of course, possible and may be preferred in certain applications. Vapor ascending through the apertures 54 retains its vertical momentum until it contacts the horizontally directed liquid being discharged from the overlying louvres 32. The vapor is then carried laterally by the liquid and is blocked from entering the downcomer 24 by the bottom plate 30 and the pressure of the liquid forced through the louvre outlet ends 46. It will be appreciated that both louvres 36 and apertures 54 can be provided in tray area 34 if desired.

Figure 6:
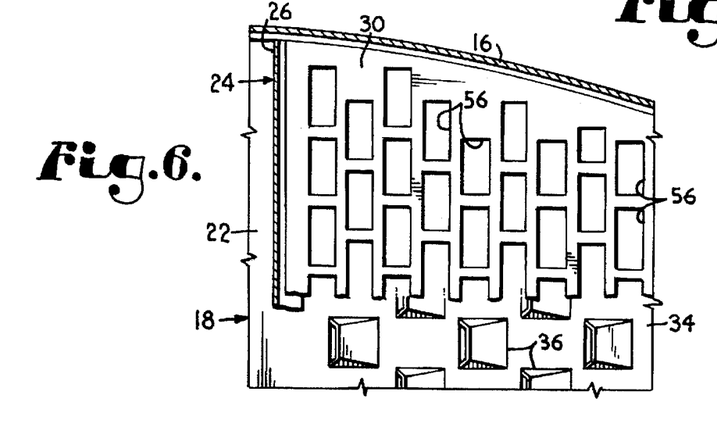
FIG. 6 is a fragmentary top plan view of another variation of the vapor-liquid contact tray and downcomer assembly in which elongated slots rather than louvres are provided in the downcomer bottom plate.
Figure 9:
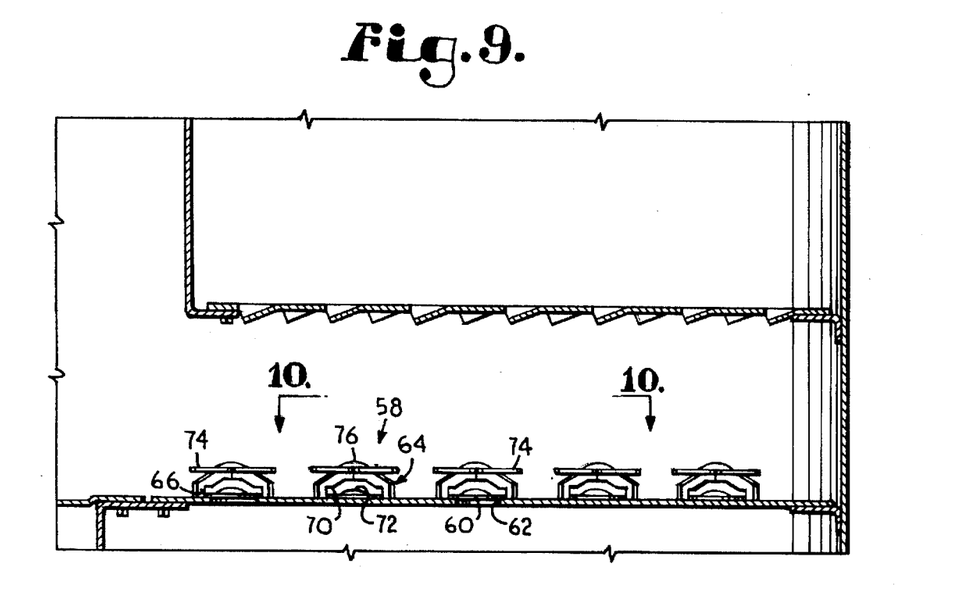
FIG. 9 is an enlarged side elevation view of a still further variation of the vapor-liquid contact tray and downcomer assembly in which floating valves are utilized on the tray deck to deflect and prevent entry of liquid into the apertures in the tray.
Figure 10:
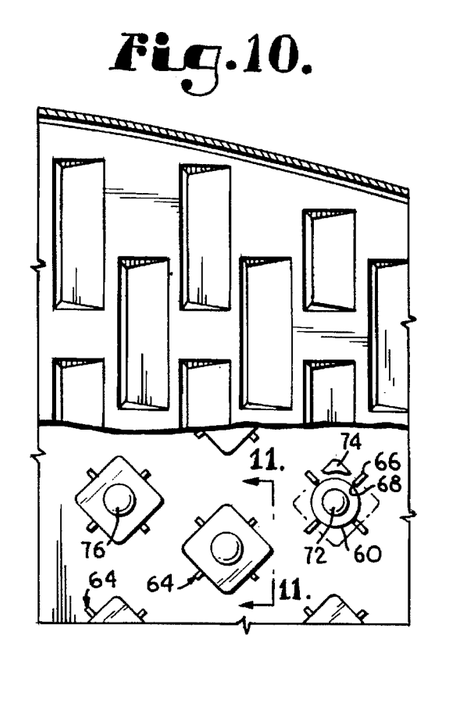
FIG. 10 is a fragmentary top plan view of the assembly shown in FIG. 9 with portions of the downcomer bottom plate being broken away to show the underlying tray.

Turning to FIG. 6, the louvres 32 in the downcomer bottom plate 30 can be replaced with openings or apertures, such as in the form of elongated rectilinear slots 56. Even without the use of louvres 32 to impart a horizontal momentum to the liquid being discharged from the downcomer outlet region, the provision of the louvres 36 in the underlying tray 18 with their ramps 40 and vertically oriented outlet ends 46 can be sufficient to block passage of liquid through the tray 18. Although all of the louvres 32 have been replaced by slots 56 in FIG. 6, a combination of louvres 32 and slots 56 can be provided if desired.

Turning now to FIGS. 9–13, the liquid receiving area 34 of tray 18 can be modified to provide valves 58 which are constructed to block the flow of liquid through tray area 34. Valves 58 can be used alone in combination with one or more of the previously described louvres 36 and apertures 54. The valves 58 comprise a circular floating cap 60 which overlies an opening 62 extending through tray 18. The floating cap 60 is sized slightly larger than the opening 62 so that it can completely cover the opening 62 and be supported by the upper surface of the tray about the periphery of the opening 62. The floating cap 60 is free to float vertically a short distance within an overlying frame 64. Frame 64 comprises generally flat guide legs 66 which are joined together at a center point spaced above the floating cap 60 and tray 18. The legs 66 extend outwardly from the center point a distance sufficient to clear the floating cap 60 and then extend vertically downward and are attached to the top surface of the tray 18. Each leg 66 has a vertical inner guide surface 68 which contacts and guides the floating cap 60 as the floating cap moves vertically up and down. The legs 66 are suitably positioned so that the inner guide surfaces 68 permit vertical movement but prevent lateral movement of the floating cap 60. The upper end of each inner guide surface 68 includes an inwardly extending shoulder 70 which blocks the upward travel of the floating cap 60 at the desired vertical distance above the tray 18.

Figure 11:
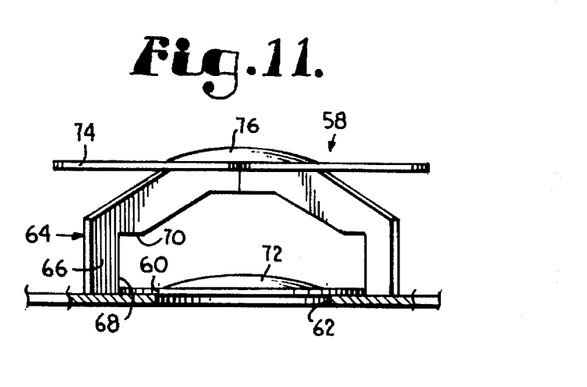
FIG. 11 is an enlarged side elevation view of one of the floating valves shown in FIGS. 9 and 10 and taken in vertical section along line 11—11 of FIG. 10 in the direction of the arrows.
Figure 12:
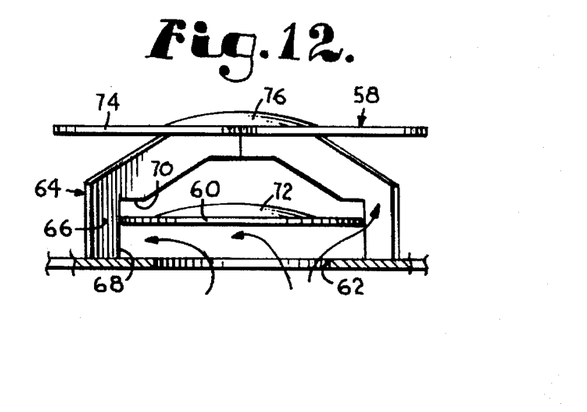
FIG. 12 is a side elevation view of the floating valve shown in FIG. 11 but illustrating the flow of vapor through the valve.

As is best illustrated in FIGS. 11 and 12, the weight of the floating cap 60 causes it to rest on the tray 18 and block the opening 62 until a sufficient upward force is exerted by vapor which flows upwardly and enters the opening 62 in tray 18. The floating cap 60 is then lifted upwardly by the force of the vapor and is held against the shoulder 70 of frame 64 while the vapor passes through the tray 18. A slight dome 72 can be formed in the floating cap 60 to facilitate directional flow of the vapor and to prevent pooling of the liquid on the top of the floating cap 60.

In accordance with the present invention, the valves 58 include a stationary cap 74 which is positioned on frame 64 above the floating cap 60. The stationary caps 74 deflect the momentum of downwardly flowing liquid to reduce the opportunity for the liquid to interfere with the desired vertical movement of the floating caps 60. The stationary caps 74 are sized at least slightly larger than the floating caps 60 and can be of various configurations. As illustrated, the stationary caps 74 are square and generally flat with a center dome 76.

In use, the valves 58 permit vapor to flow upwardly through the tray 18 while blocking downward passage of the liquid through the tray 18. When the valves 58 are closed, as illustrated in FIG. 11, the floating cap 60 rests on the tray 18 and prevents liquid which may be present on the tray 18 from passing downwardly through the openings 62 in the tray. When the vales 58 are open as in FIG. 12, the floating cap 60 is lifted vertically upward by the force of the vapor and is guided along its vertical movement by the guide surfaces 68 of the legs 66 which surround the floating cap 60. The stationary caps 74 overlie and protect the floating caps 60 so that the downward momentum of liquid does not interfere with the operation of the floating caps 60. The overlying downcomer bottom plate 30 can contain louvres 32 or openings such as the slots 56 previously described, or combinations thereof.

Figure 13:
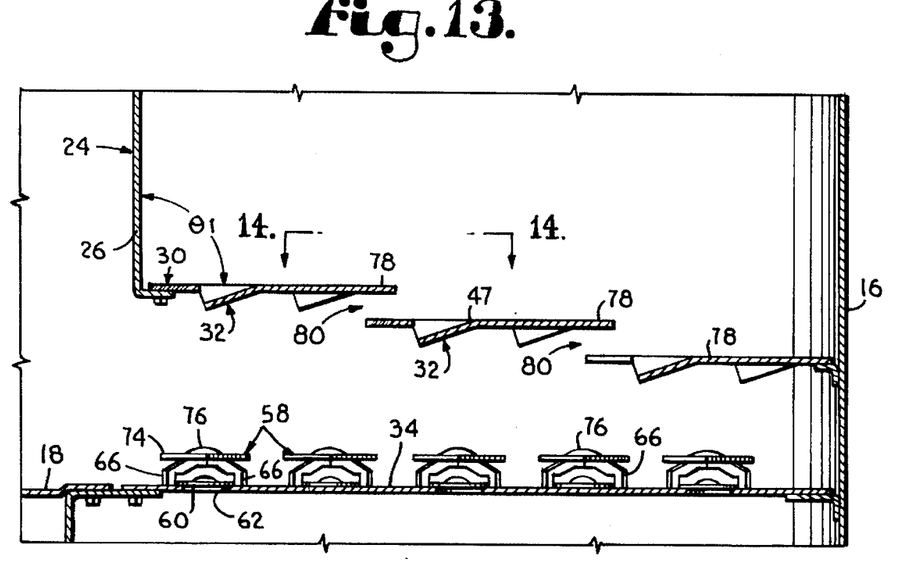
FIG. 13 is a side elevation view of another variation of the vapor-liquid contact tray and downcomer assembly in which a segmented downcomer bottom plate is utilized to provide increased liquid flow capacity through the bottom plate.
Figure 14:
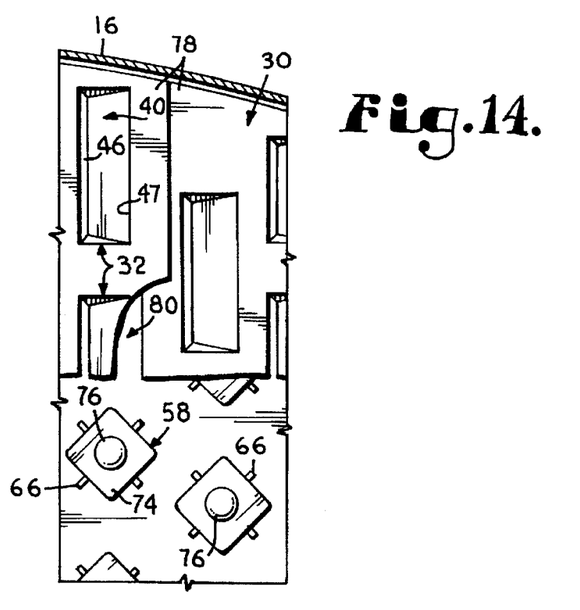
FIG. 14 is a fragmentary top plan view of the assembly shown in FIG. 13 with portions of the segmented downcomer bottom plate being broken away to show the overlapping construction thereof as well as the underlying tray.

Turning to FIGS. 13 and 14, the downcomer bottom plate 30 can be further modified to contain vertically spaced apart plate segments 78 which partially overlap to form horizontally elongated passages or louvres 80. The amount of overlapping between the plate segments 78 should be sufficient to cause liquid to be redirected horizontally by the underlying plate segment 78 before it exits through an outlet end of the louvre 80. By way of example and not limitation, in some applications the vertical spacing between the plate segments 78 should be approximately one-half of the horizontal overlap of the plate segments 78. The number of, and vertical spacing between, the plate segments 78 can be varied to achieve the desired uniform distribution of liquid as it pass through the bottom plate 30.

Each of the plate segments 78 extends rearwardly from its forward edge at an angle $\theta_1$ within the range of 60° to 150° and preferably within the range of 90° to 120°. As illustrated, the angle $\theta_1$ is approximately 90° for each plate segment 78. It is to be understood, however, that all of the plate segments 78 need not extend at the same angle.

The elongated louvres 80 are particularly advantageous because they not only redirect the liquid horizontally much like the louvres 32 previously discussed but also increase the open area available for liquid flow through the plate 30, thereby reducing the pressure drop across the bottom plate 30. All of the liquid flow through the bottom plate 30 can be through the elongated louvres 80 if desired. Alternatively, a portion of the liquid can pass through the elongated louvres 80 while other portions can flow through the louvres 32 which can be provided in the plate segments 78 and/or other openings such as slots 56 previously described. The desired amount of liquid flow through the elongated louvres 80 can be achieved by appropriate vertical spacing between the plate segments 78 and by providing the desired number of louvres 80.

The downcomer 24 with plate segments 78 can be used in combination with any suitable tray designs, including those previously described. As illustrated, the plate segments 78 are used with a tray 18 containing valves 58 which are described above in greater detail with reference to FIGS. 9–12.

Figure 15:
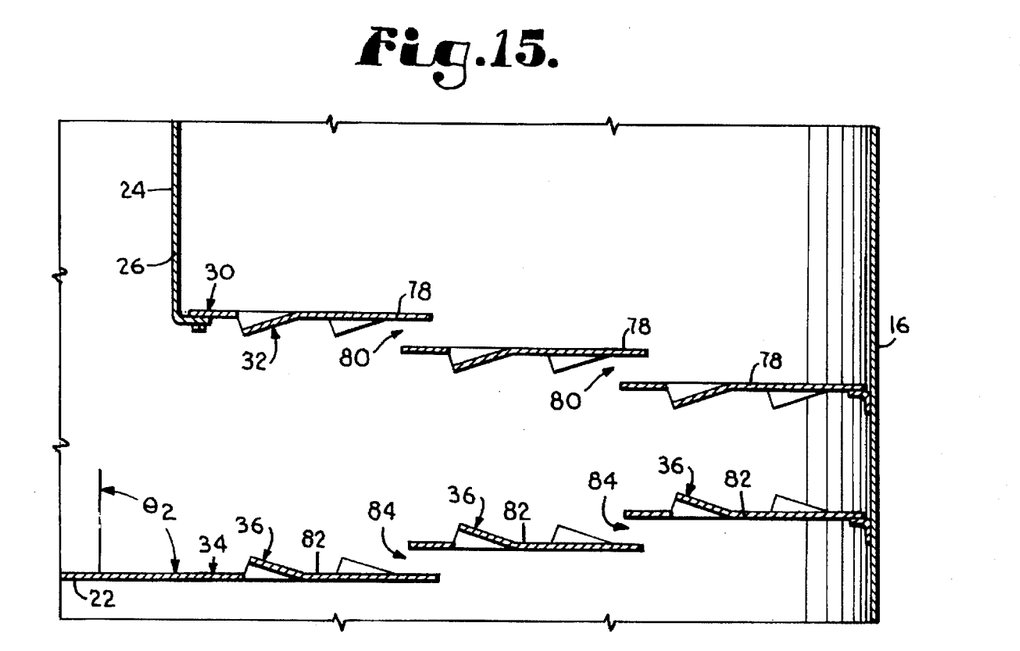
FIG. 15 is a side elevation view of another variation of the vapor-liquid contact tray and downcomer assembly in which a segmented tray is utilized to provide increased vapor flow capacity through the liquid receiving area of the tray.

Turning now to FIG. 15, the liquid receiving area 34 of tray 18 can also be modified to contain vertically spaced apart tray segments 82 which overlap in part to form horizontally elongated passages or louvres 84. The amount of overlapping between the tray segments 82 should be sufficient to ensure that the ascending vapor will impinge upon the overlying tray and be redirected in a horizontal direction. Vapor which enters the elongated louvres 84 thus exits the louvres 84 through an outlet end which presents a substantially vertical opening.

The tray segments 82 extend rearwardly from their forward edges at an angle $\theta_2$ which is within the range of 60° to 90° and preferably within the range of 75° to 90°. The tray segments 82 can be parallel or they can extend at different angles.

The elongated louvres 84 formed by the spaced apart tray segments 82 operate to redirect the ascending vapor in a horizontal direction in a manner similar to the tray louvres 36 previously described. The number of, and vertical spacing between, the tray segments 82 is selected to provide the desired discharge area for the elongated louvres 84 while still providing for a uniform distribution of vapor through the tray 18. All of the vapor flow through the liquid receiving area 34 of tray 18 can be through the elongated louvres 84 or additional openings, apertures or louvres 36 can be utilized to provide alternate flow paths for the vapor. The tray segments 82 can be used in combination with any of various suitable downcomer designs, including but not limited to those previously described which employ a bottom plate 30.

Figure 16:
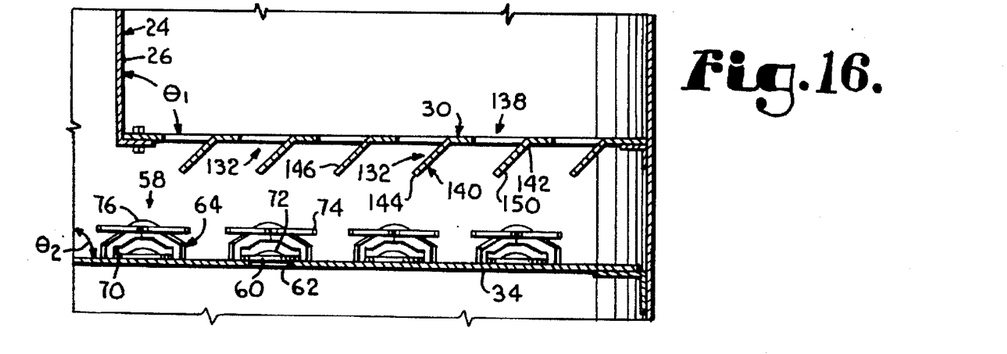
FIG. 16 is a side elevation view of another variation of a vapor-liquid contact tray and downcomer assembly shown in FIG. 9.

Turning to FIG. 16, a further variation of the design of the louvres in bottom plate 30 will now be described. Louvres 132 illustrated in FIG. 16 comprise a ramp 140 attached at one end 142 to bottom plate 30 and spaced downwardly from the bottom plate at an opposite end 144. A channel 138 formed in part by the ramp 140 extends through the bottom plate 30 to provide a passageway for liquid to pass through the bottom plate. An inlet end of the channel 138 is formed by an opening of desired shape and size formed in the bottom plate 30. Liquid entering the channel 138 is then redirected by impact against the ramp 140 to impart an at least partially horizontal velocity component to the liquid.

The ramp 140 itself comprises a generally planar main wall 150 which can be formed by punching a slit in the bottom plate and depressing the material adjacent the slit. Ramp 140 is thus of the same construction as ramps 40 previously described except the sides of main wall 150 are not joined to the bottom plate by side walls. Instead, the sides of main wall 150 are spaced from the bottom plate to form open areas through which liquid may flow when exiting the channel 138. Thus, although liquid is preferentially directed through the outlet end 146 of channel by the inclination of ramp 140, other portions of the liquid are discharged through the open areas along the sides of the ramp 140.

When using louvres 132 in downcomer bottom plate 130, it has been found to be advantageous to include valves 58 of the type previously described in the liquid receiving area 34 of the underlying tray 18 in order to reduce the opportunity for liquid to be forced downwardly through the openings 62 in the receiving area. Thus, the combination of louvres 132 in downcomer bottom plate 30 and valves 58 in the tray receiving area 34 are one presently preferred embodiment of the present invention. The bottom plate 30 can be inclined at an angle $\theta_1$ desirably within the range of 60° to 150° and preferably within the range of 90° to 120° as previously described. Likewise, the receiving area 34 can be inclined at an angle $\theta_2$ desirably within the range of 60° to 90° and preferably within the range of 75° to 90° as previously described.

Figure 17:
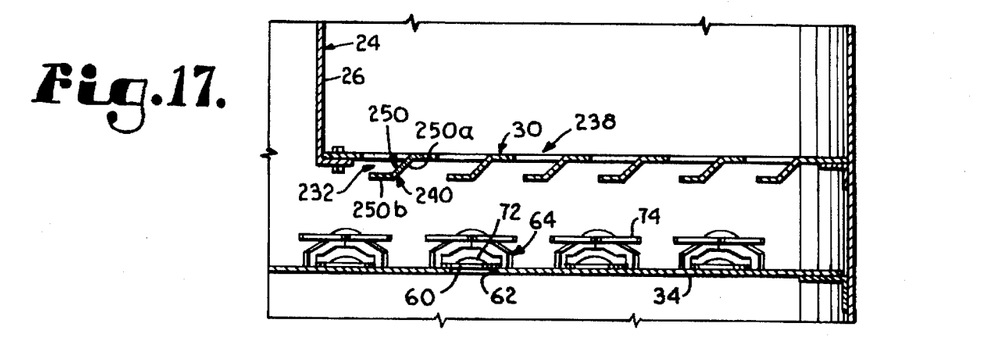
FIG. 17 is a side elevation view of yet another variation of the vapor-liquid contact tray and downcomer assembly.

Turning additionally to FIG. 17, louvres 232 are illustrated which are generally identical to louvres 132 described with reference to FIG. 16 except that each main wall 250 is formed into two or more segments 250a and 250b which are joined together and lie in intersecting planes. Main wall segment 250a is joined at one end to the bottom plate 30 and is spaced at an opposite end downwardly from the bottom plate 30. The other segment 250b is joined at one end to the opposite end of segment 250a and extends parallel to but below the bottom plate 30. It is to be understood that the segment 250b need not be coplanar with the bottom plate but may extend at an angle thereto if desired.

The main wall segments 250a and 250b are preferably formed by slitting and punching the bottom plate 30 in the manner previously described. Although two segments are illustrated for each main wall 250, additional segments can be used if desired. Except for the segmentation of main wall 250, louvres 232 operate in the same manner as those louvres previously described. Thus, the combination of louvres 232 in downcomer bottom plate 30 and valves 58 in the tray receiving area 34 is another presently preferred embodiment of the present invention.

Figure 18:
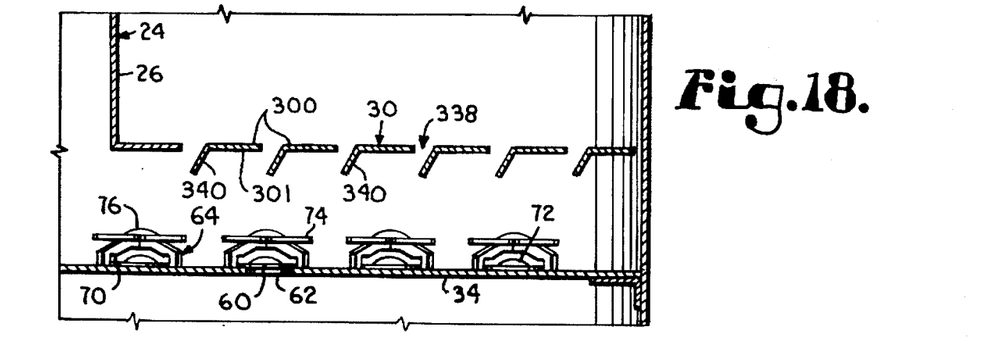
FIG. 18 is a side elevation view of a further variation of the vapor-liquid contact tray and downcomer assembly.

It will be appreciated that the louvres can be formed in ways other than by slitting and punching the downcomer bottom plate 30. For example, as can be seen in FIG. 18, the downcomer bottom plate 30 and associated louvres can be formed by positioning a plurality of angled members 300 in spaced apart and parallel relationship. The angled members 300 can be supported in the desired positions by any suitable method such as by support brackets attached to the ends of the angled members 300 and supported on the interior of the column shell 16. One or more support mechanisms can also be utilized intermediate the ends of the angled members 300 if desired.

Each angled member 300 comprises a plate portion 301 and an inclined ramp 340 which is joined to the plate portion 301. The angled members 300 are of a length to extend across the width of the downcomer outlet and are positioned so that the plate portions 301 lie in a common plane to form the bottom plate of the downcomer. Elongated channel 338 openings are thus formed in the open areas between adjacent spaced apart plate members 301. Liquid entering the channel 338 openings is then deflected by the ramps 340 and exits the channels 338 with an at least partially horizontally directed velocity component. The combination of angled members 300 forming the downcomer bottom plate and valves 58 in the tray receiving area 34 is another presently preferred embodiment of the present invention.

Figure 19:
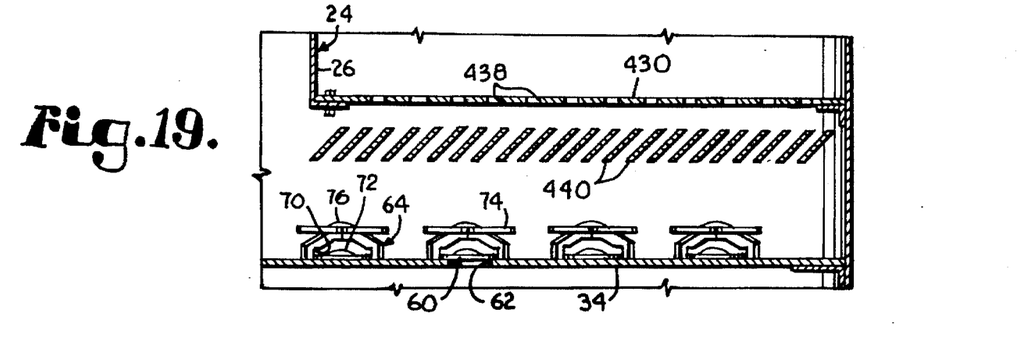
FIG. 19 is a side elevation view of a further embodiment of a vapor-liquid contact tray and downcomer assembly in accordance with the present invention.

It should also be appreciated that the ramps used to deflect liquid exiting the downcomer do not always need to be formed integrally with the downcomer bottom plate. For example, as illustrated in FIG. 19, a plurality of inclined ramps 440 are separated from and are spaced a preselected distance below the downcomer bottom plate 430. The ramps 440 as illustrated are inclined and are substantially planar but they can be of other configurations, including those previously described, suitable for imparting a horizontal velocity component to liquid being discharged through openings 438 in bottom plate 430. The spacing between the bottom plate 430 and the upper end of ramps 440 can be varied as desired but will typically be within the range of 0 to 3 inches.

The ramps 440 are positioned at the same vertical position such that the upper and lower ends of the ramps respectively lie in common horizontal planes. The distance of separation between adjacent ramps 440 can be varied as desired. The ramps are supported in the desired positions in any suitable fashion, such as by vertical plates or other members which extend downwardly from the downcomer bottom plate and are attached to or have openings to receive the ramps 440. Again, the use of valves 58 in the tray receiving area 34 in combination with the ramps 440 is a further preferred embodiment of the present invention.

It will be appreciated that the ramps in the foregoing embodiments can be inclined at angles other than those illustrated. Typically, the ramps will be inclined at an angle within the range of 15° to 60° from the horizontal.

From the foregoing, it will be seen that this invention is one well adapted to attain all the ends and objects hereinabove set forth.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

Having thus described the invention, what is claimed is:

1. A mass transfer column comprising:

an external shell defining an interior region open to the flow of vapor and liquid streams;

a plurality of generally horizontally disposed and vertically spaced apart trays positioned in said open interior region to facilitate contact between the vapor and liquid streams when flowing in the interior region of the column, said trays having an upper surface along which the liquid stream can flow;

at least one downcomer associated with each of said trays and extending downwardly toward an underlying tray to deliver liquid from the associated tray to the underlying tray, said downcomer having an inlet region through which liquid enters the downcomer and an outlet region through which liquid exits the downcomer, said outlet region of the downcomer being positioned above a liquid receiving area of the underlying tray;

a bottom plate closing the outlet region of the downcomer and having a plurality of openings through which liquid may flow to exit the downcomer;

a plurality of spaced apart ramps extending below said downcomer bottom plate in the path of said liquid exiting the downcomer, said ramps comprising a main wall inclined at an angle to a vertical axis of the column and positioned to redirect said liquid exiting the downcomer and impart an at least partially horizontal momentum to the redirected liquid, thereby reducing a vertically downward force with which the redirected liquid impacts the liquid receiving area of the underlying tray;

a plurality of apertures in said trays through which ascending vapor may flow to interact with the liquid stream flowing across the upper surface of the trays;

a plurality of valves positioned on and extending above the liquid receiving area of the trays, at least some of said valves comprising an aperture extending through the liquid receiving area of the tray, a frame extending above the liquid receiving area of the tray, and a floating cap moveable within the frame in response to the upward force of vapor flow into the aperture between a lower position covering said aperture to resist liquid entry therein and a raised position spaced above the tray to permit vapor flow through the aperture.

2. The mass transfer column as set forth in claim 1, including a stationary cap positioned above the floating cap to deflect the downward flow of liquid away from the floating cap.

3. The mass transfer column as set forth in claim 2, wherein said liquid receiving area of at least some of said trays comprises at least two vertically spaced apart and partially overlapping tray segments and wherein a horizontally elongated passageway is formed between the overlapped portions of the tray segments which is open to the flow of vapor through the liquid receiving area of the tray, wherein said tray segments are overlapped sufficiently to cause vapor flowing through the elongated passageway to exit the passageway with an at least partially horizontal velocity.

4. The mass transfer column as set forth in claim 1, wherein the main walls of said ramps are connected at one end to the bottom plate and are spaced below the bottom plate at an opposite end.

5. The mass transfer column as set forth in claim 4, wherein said main walls each comprise at least two segments joined together and lying in intersecting planes.

6. The mass transfer column as set forth in claim 4, wherein said bottom plate is formed from a plurality of spaced apart plate segments and wherein said ramps are joined to said plate segments.

7. The mass transfer column as set forth in claim 1, wherein the main walls of said ramps are separated from and are spaced below said bottom plate.

8. A mass transfer column comprising:

an external shell defining an interior region open to the flow of vapor and liquid streams;

a plurality of generally horizontally disposed and vertically spaced apart trays positioned in said open interior region to facilitate contact between the vapor and liquid streams when flowing in the interior region of the column, said trays having an upper surface along which the liquid stream can flow;

at least one downcomer associated with each of said trays and extending downwardly toward an underlying tray to deliver liquid from the associated tray to the underlying tray, said downcomer having an inlet region through which liquid enters the downcomer and an outlet region through which liquid exits the downcomer, said outlet region of the downcomer being positioned above a liquid receiving area of the underlying tray, said liquid receiving area of the tray extending rearwardly from a forward end thereof at an angle $\theta_2$ of between approximately 60° and 90° to the vertical;

a bottom plate closing the outlet region of the downcomer and extending rearwardly from a forward end of the bottom plate at an angle $\theta_1$ of between approximately 60° and 150° to the vertical, said bottom plate having a plurality of openings through which liquid may flow to exit the downcomer;

a plurality of spaced apart ramps extending below said downcomer bottom plate in the path of said liquid exiting the downcomer, said ramps comprising a main wall inclined at an angle to a vertical axis of the column and positioned to redirect said liquid exiting the downcomer and impart an at least partially horizontal momentum to the redirected liquid, thereby reducing a vertically downward force with which the redirected liquid impacts the liquid receiving area of the underlying tray;

a plurality of apertures in said trays through which ascending vapor may flow to interact with the liquid stream flowing across the upper surface of the trays; and a plurality of valves positioned on and extending above the liquid receiving area of the trays, each of said valves comprising:

a second aperture distributed in and extending through the liquid receiving area of one of the trays;

a frame extending above the liquid receiving area of the tray;

a floating cap moveable within the frame in response to the upward force of vapor flow into the second aperture between a lower position covering said aperture to resist liquid entry therein and a raised position spaced above the tray to permit vapor flow through the second aperture; and a stationary cap positioned above the floating cap to deflect the downward flow of liquid away from the floating cap.

9. The mass transfer column as set forth in claim 8, wherein the main walls of said ramps are connected at one end to the bottom plate and are spaced below the bottom plate at an opposite end.

10. The mass transfer column as set forth in claim 9, wherein said main walls each comprise at least two segments joined together and lying in intersecting planes.

11. The mass transfer column as set forth in claim 9, wherein said bottom plate is formed from a plurality of spaced apart plate segments and wherein said ramps are joined to said plate segments.

12. The mass transfer column as set forth in claim 8, wherein the main walls of said ramps are separated from and are spaced below said bottom plate.

13. The vapor-liquid contact tray as set forth in claim 8, wherein said frame comprises vertically extending legs spaced apart around a periphery of the floating cap and having guide surfaces to direct the floating cap in a vertical direction during movement between the lower and raised positions.

14. The vapor-liquid contact tray as set forth in claim 13, wherein said legs include a shoulder to engage the floating cap and limit further vertical movement of the floating cap beyond said raised position.

15. A vapor-liquid contact tray and downcomer assembly for placement within a mass transfer column to facilitate contact and interaction between ascending vapor and descending liquid, said assembly comprising:

a plurality of vertically spaced apart trays, each of said trays having an upper surface along which liquid can flow and containing apertures through which vapor can ascend to interact with said liquid on the upper surface;

at least one downcomer associated with each of said trays and extending downwardly toward an underlying tray to deliver liquid from the associated tray to the underlying tray, said downcomer having an inlet region through which liquid enters the downcomer and an outlet region through which liquid exits the downcomer, said outlet region of the downcomer being positioned above a liquid receiving area of the underlying tray;

a bottom plate closing the outlet region of the downcomer and having a plurality of openings through which liquid may flow to exit the downcomer;

a plurality of spaced apart ramps extending below said downcomer bottom plate in the path of said liquid exiting the downcomer, said ramps comprising a main wall inclined at an angle to a vertical axis of the column and positioned to redirect said liquid exiting the downcomer and impart an at least partially horizontal momentum to the redirected liquid, thereby reducing a vertically downward force with which the redirected liquid impacts the liquid receiving area of the underlying tray;

a plurality of apertures in said trays through which ascending vapor may flow to interact with the liquid stream flowing across the upper surface of the trays; and a plurality of valves positioned on and extending above the liquid receiving area of the trays, each of said valves comprising:

a second aperture distributed in and extending through the liquid receiving area of one of the trays;

a frame extending above the liquid receiving area of the tray;

a floating cap moveable within the frame in response to the upward force of vapor flow into the second aperture between a lower position covering said aperture to resist liquid entry therein and a raised position spaced above the tray to permit vapor flow through the second aperture; and a stationary cap positioned above the floating cap to deflect the downward flow of liquid away from the floating cap.

16. The assembly as set forth in claim 15, wherein the main walls of said ramps are connected at one end to the bottom plate and are spaced below the bottom plate at an opposite end.

17. The assembly as set forth in claim 16, wherein said main walls each comprise at least two segments joined together and lying in intersecting planes.

18. The assembly as set forth in claim 16, wherein said bottom plate is formed from a plurality of spaced apart plate segments and wherein said ramps are joined to said plate segments.

19. The assembly as set forth in claim 15, wherein the main walls of said ramps are separated from and are spaced below said bottom plate.

20. A method for interacting liquid and vapor streams on a vapor-liquid contact tray and downcomer assembly provided in an interior region of a mass transfer column, said assembly comprising a plurality of generally horizontally disposed and vertically spaced apart trays positioned in said open interior region, a plurality of apertures in said trays, at least one downcomer associated with each of said trays and extending downwardly toward an underlying tray, and a bottom plate closing an outlet region of the downcomer, said method comprising the steps:

(1) directing a liquid stream to one of said trays;

(2) flowing the liquid stream across said one tray in a first direction;

(3) directing said liquid stream from said one tray into an inlet region of the associated downcomer and passing the liquid stream downwardly through said associated downcomer;

(4) discharging the liquid stream in said associated downcomer onto a liquid receiving area of an underlying tray with an at least partially horizontal momentum to reduce the vertically downward force with which the liquid stream impacts the liquid receiving area by directing the liquid stream against a plurality of spaced apart and inclined ramps lying below the bottom plate, whereby said liquid stream is redirected by said ramps to have an at least partially horizontal momentum;

(5) flowing said liquid stream across said underlying tray in said opposite direction;

(6) repeating steps (3)–(5) on successive lower ones of said trays;

(7) directing a portion of the vapor stream upwardly through said apertures in the trays to interact with said liquid stream flowing across the trays; and (8) directing another portion of the vapor stream upwardly through the liquid receiving area of the underlying tray and imparting an at least partially horizontal momentum to the vapor stream by passing the vapor stream through a plurality of spaced apart valves extending above the liquid receiving area of the trays and each comprising a second aperture distributed extending through the liquid receiving area of one of the trays and a floating cap moveable within a frame in response to the upward force of vapor flow into the second aperture between a lower position covering said aperture to resist liquid entry therein and a raised position spaced above the tray to permit vapor flow through the second aperture, whereby said vapor stream is redirected by said floating cap to impart said at least partially horizontal momentum.

* * * * *